United States Patent [19]

Perez et al.

[11] Patent Number: 4,770,568
[45] Date of Patent: Sep. 13, 1988

[54] METHOD AND APPARATUS FOR CONTACTLESS MONITORING OF TOOLS

[75] Inventors: Juan Perez; Hans-Peter Schneider, both of Essen, Fed. Rep. of Germany

[73] Assignee: Fried. Krupp Gesellschaft mit beschränkter Haftung, Essen, Fed. Rep. of Germany

[21] Appl. No.: 24,796

[22] Filed: Mar. 11, 1987

[30] Foreign Application Priority Data

Mar. 14, 1986 [DE] Fed. Rep. of Germany ....... 3608572

[51] Int. Cl.⁴ .................. B23B 47/24; G08B 21/00
[52] U.S. Cl. ............................. 408/6; 241/30; 241/36
[58] Field of Search ................ 241/37, 101.3, 36, 30; 408/6, 13, 16; 51/2 AA, 2 Y, 165.75; 73/DIG. 2, DIG. 3, 865.7; 324/202, 205, 207, 208

[56] References Cited

U.S. PATENT DOCUMENTS 3,747,085  7/1973  Bala et al. ........................ 408/6 X
4,205,797  6/1980  Bennett et al. ................... 241/37 X

OTHER PUBLICATIONS

VDI-Z, pp. 373–376, 5-1985.

*Primary Examiner*—Mark Rosenbaum
*Attorney, Agent, or Firm*—Spencer & Frank

[57] ABSTRACT

Method and apparatus for the contactless monitoring of a working tool for breakage or wear, the tool being installed in a machine having at least two parts, with one of the parts being stressed by forces imposed on the working tool during machine operation, by: inductively monitoring the position of the one part relative to the other of the two parts during machine operation to produce at least one induced voltage representative of a change in relative position; determining the value of the induced voltage; and emitting a signal when a predetermined change occurs in the value of the induced voltage.

22 Claims, 4 Drawing Sheets

METHOD AND APPARATUS FOR CONTACTLESS MONITORING OF TOOLS

BACKGROUND OF THE INVENTION

The application relates to a method and an apparatus for monitoring tools for breakage and wear without contacting them, particularly those tools which can automatically be exchanged in machine tools.

With increasing automatization of numerically controlled machines, it becomes more and more important to be able to automatically monitor these tools, independently of operating personnel. For example, indirect measuring methods are known which monitor by means of mechanical, inductive, capacitive or optical scanning systems and which examine the tool after each processing operation to assure that it is still in good condition. However, these systems have the drawback that they are unable to recognize a sudden total failure of the tool soon enough and thus the consequential damages caused by breakage of the tool can often not be prevented.

A system has been developed for early detection of total failure, or breakage, in ceramic cutting implements where cracks in the ceramic cutting member lead to destruction of a thin conductive path vapor-deposited on the end flank of the implement. The drawbacks here, however, are the high costs involved for the vapor-deposition of conductor paths at each end flank and the attachment of contact points at the tool holder. Furthermore, because of the insulating properties required of the cutting substance, the measuring process is limited to ceramic cutting implements and does not permit the detection of microcracks at a major cutting edge of a tool.

The publication VDI-Z 116 (1974), pages 1427 et seq.—discloses a fiber optic measuring method in which a scanning head equipped with five bands of 25μ thick glass fibers is accommodated in a parallel rocker and measures wear in that a rotating eccentric passes it along the flank of a turning tool. Due to the differences in reflection behavior between worn and unworn flanks, a light signal results in a photo voltage whose pulse flank width is a function of the width of the existing wear trace.

But this method is also very inaccurate and cannot stop the machine fast enough if breaks occur very suddenly.

SUMMARY OF THE INVENTION

Therefore, an object of the present invention is to provide a method and an apparatus which reliably convert the forces occurring in the tool, the tool carrier or the basic tool holder during use of the tool, for example, during chip cutting, into usable signals. A further object of the invention is to provide a method and apparatus which are as simple as possible but operate reliably with a view toward early detection of a threatening break in the tool and for monitoring wear.

This is accomplished by a method in which the relative positions of, and/or the relative change in position between, two adjacent parts, of which at least one is loaded with forces during operation of the tool, are constantly measured inductively and monitored. Such parts are, for example, the tool, the tool carrier and/or the basic tool holder, possibly also the turret in which the basic tool holder is inserted. If there is a change or a given limit value is exceeded, a signal is emitted. Thus the inductive measurement may either be static or dynamic.

The invention is based on the following realization: when a workpiece is being worked, the tool as well as the tool carrier and the basic tool holder are deformed; if the force transfer to the tool is of sufficient magnitude, the turret in which the basic tool holder is fastened may possibly also be deformed. If now one or a plurality of these parts are simultaneously equipped with a weak magnet which has a nonuniform magnetic field and if a device for measuring magnetic field intensity is mounted stationarily and free of vibrations in the vicinity of the above-mentioned magnet, changes in the location of each magnet participating in the movement of the carrier bring about a change in the measured magnetic field. In other words, if there is relative movement or a change in distance between the magnet and the stationary measuring device, the magnetic flux density becomes greater the closer the surface of the magnet and decreases the farther the magnet is removed.

According to a further feature of the invention, however, the magnetic field can also be generated externally, i.e. the magnet need not necessarily be fastened to the tool, the tool carrier and/or the basic tool holder. Since in most cases, these tool components are ferromagnetic, they influence the magnetic flux density of an externally applied field depending on their relative position or change in relative position, respectively.

According to a preferred embodiment, the magnetic field can also be monitored by means of an induction coil. High frequencies develop when there is a break in the tool and these can be detected particularly well with an induction coil.

While a Hall probe, preferably embedded in an iron core around which the coil is wound, is suitable for making static induction measurements, dynamic induction measurements can be made by means of an induction coil. The Hall probe fed by a control current and/or the above-mentioned coil are connected with an amplifier and a voltage measuring and indicating device. Thus, this measuring method and the measuring arrangement employed to perform the measurements have the advantage of being particularly cost effective while being substantially more sensitive.

The spacing of the coil and/or the Hall probe is selected so that it is as small as possible but, on the other hand, prevents them from coming into contact with the parts of the machine tool in question.

The present invention has the following advantages: deformation of the tool, the tool carrier and the basic tool holder can be taken primarily as a measure of wear of the tool, e.g. a reversible cutting plate, since the force acting on the tool increases with increasing wear. The static induction measurement by means of a Hall probe and monitoring of the results of the measurements serve primarily to monitor the tool for wear.

A break of the tool is advantageously detected by the induction coil. If there is a break in the tool, the entire machine is briefly relieved of cutting or compressive pressure, i.e. the previously existing deformation changes, which causes a voltage to be induced. The breaking process takes place within a few milliseconds, and the change of field occurs just as quickly so that the machine tool can be shut down already immediately upon occurrence of the tool break.

Moreover, with the method and the apparatus according to the invention, small forces which cause a change in the shape of the surface of the tool, the tool carrier or the basic tool holder can be used to produce useful signals which give an early warning long before excessive wear occurs or can indicate the probability of an actual break in the tool.

The predominant frequencies occurring during the usual workpiece processing, e.g. during chip breaking operations, lie in a range below 200 Hz; when there is a break they generally lie in a frequency range of 500 to 1000 Hz. The result is that the movement occurring during working of the workpiece induces a far lower voltage than is the case when the tool breaks. Thus, the method according to the invention produces a very good signal to noise ratio which cannot be attained with the prior art measuring methods.

Moreover, measuring as well as further processing of the measurement data obtained for monitoring wear and breakage can be implemented very easily.

Finally, the invention has the advantage that the monitoring sensors can be placed almost as closely as desired to the machine part to be monitored without there being any interference with the actual processing of the workpiece or a change of tools. In the simplest case, the measuring sensor (coil, Hall probe) is aooommodated in a housing whioh is glued to the tool, the tool carrier, the basic tool holder or the turret. The present invention also permits immediate compilation of measurement data.

Embodiments of the invention are illustrated in the drawings.

DESCRIPTION OF THE PREFERRED EMBODIMENTS

Figure 1:
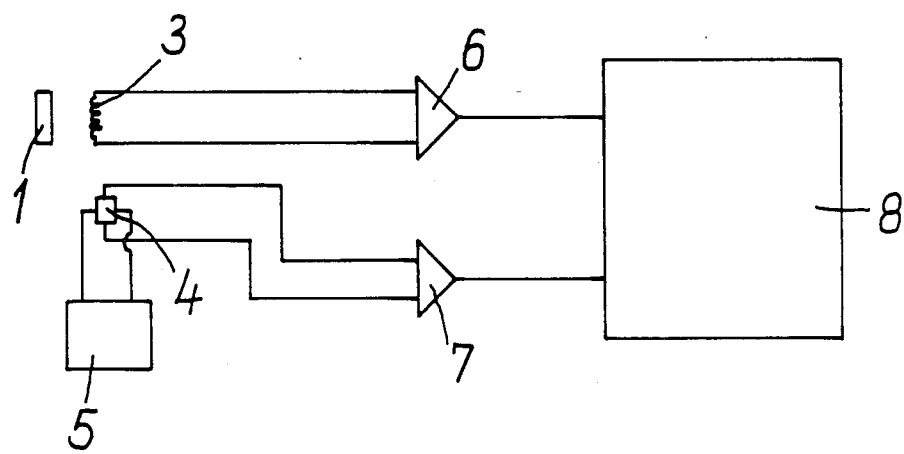
FIG. 1 is a schematic circuit diagram illustrating the measuring principle according to the invention.

Referring to FIG. 1, the method according to the invention can, in principle, be implemented with only one or a plurality of magnets 1 which are fastened either on the tool, the tool carrier or the basic tool holder or also outside of these parts, i.e. on a stationary structure. To simplify the description below, it is assumed that magnet 1 is fastened on the basic tool holder 2 shown in FIG. 2. Magnet 1 is disposed as close as possible to, and facing, an induction coil 3 and a Hall probe 4, with Hall probe 4 being supplied with a constant control current from an energy source 5.

Hall probe 4 and coil 3 are connected via appropriate lines to the inputs of amplifiers 6 and 7, respectively, the output signals from which are fed to an evaluation unit 8. This evaluation unit monitors the working process and shuts down the machine tool if there is excessive wear or if the tool breaks.

Figure 2:
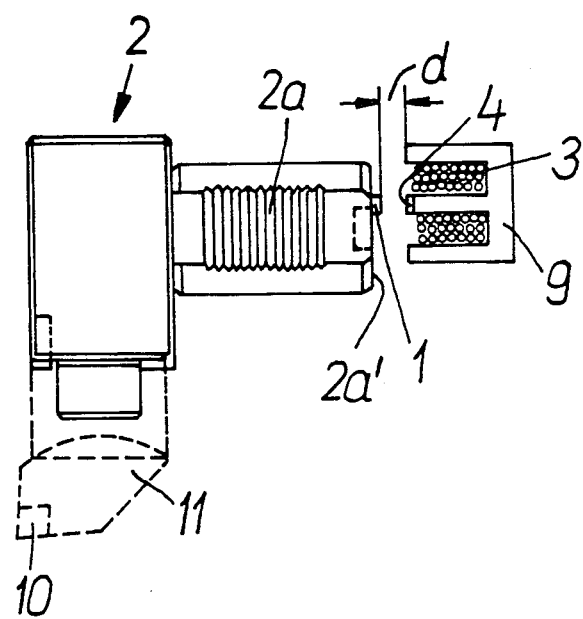
FIG. 2 is a schematic elevational view of a basic tool holder with tool carrier and tool in conjunction with an induction measuring device according to the invention.

FIG. 2 shows how induction coil 3 as well as Hall probe 4 can be accommodated in a compact manner and so as to be substantially protected against destruction. In the present case, basic tool holder 2 carries a tool 10 composed of a reversible cutting plate clamped onto a tool carrier 11 which itself is fastened to basic tool holder 2. Basic tool holder 2 has a shaft 2a, possibly having a profiled outline, which can be clamped into a turret. At frontal face 2a' of shaft 2a, a magnet 1, producing, for example, a magnetic flux density of 20 mT (T=Tesla), is fastened so as to face the measuring device, here shown to an enlarged scale. The measuring device is composed of the induction coil 3 wound around the center arm of an iron yoke 9. At the free end of the arm of this iron yoke 9, there is disposed the Hall probe 4 which is connected with its energy source (5 in FIG. 1, not shown in FIG. 2) via current supply lines. The lines leading to amplifiers 6 and 7 and those leading to evaluation unit 8 are also not shown in FIG. 2.

Due to the small distance which can be established between the magnet 1 and Hall probe 4 and induction coil 3, a weak magnet (<30 mT) is sufficient. Thus, chips possibly dropped from the tool during the working process will not adhere to magnet 1. Moreover, in the illustrated assembly, magnet 1 is not located directly in the chip region but is substantially protected against falling chips by the basic tool holder and by the turret. A few tenths of a millimeter—at a maximum, 1 mm—is sufficient as distance d between magnet 1 and coil and Hall probe, respectively. Preferably, gap d is 0.2 to 0.5 mm.

Figure 3:
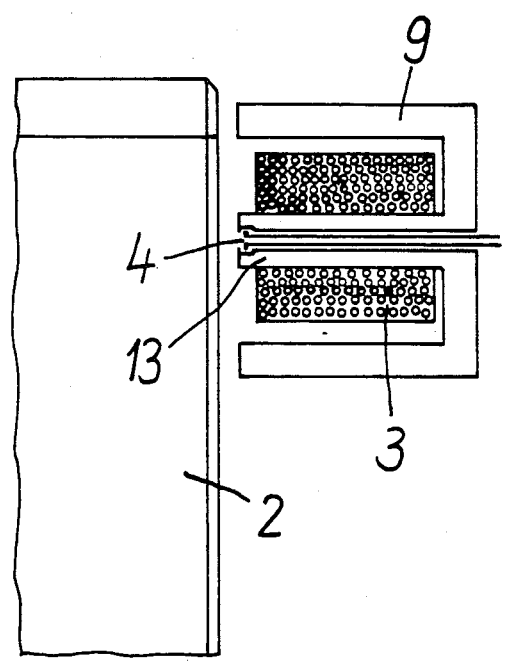
FIGS. 3 and 4 are detail views showing different embodiments of the measuring device according to the invention.

If for technical reasons, no magnets are to be fastened to the basic holder, the tool carrier or the tool itself, a measuring arrangement can be used as shown in FIG. 3. Induction coil 3 and Hall probe 4 are here accommodated in a magnet 13 which serves as the core of the coil and faces basic tool holder 2 at a gap spacing of a few tenths of a millimeter. The magnetic field is generated by magnet 13 and is influenced by the ferromagnetic basic holder 2, to an extent depending on its distance from magnet 13. A change in the position of basic tool holder 2 relative to Hall probe 4 and the speed at which basic holder 2 changes its position are immediately recorded, amplified and evaluated on the basis of the voltages induced thereby. Since, in such an arrangement magnet 13 can be protected against chips by a surrounding housing, stronger magnets can also be used.

Figure 4:
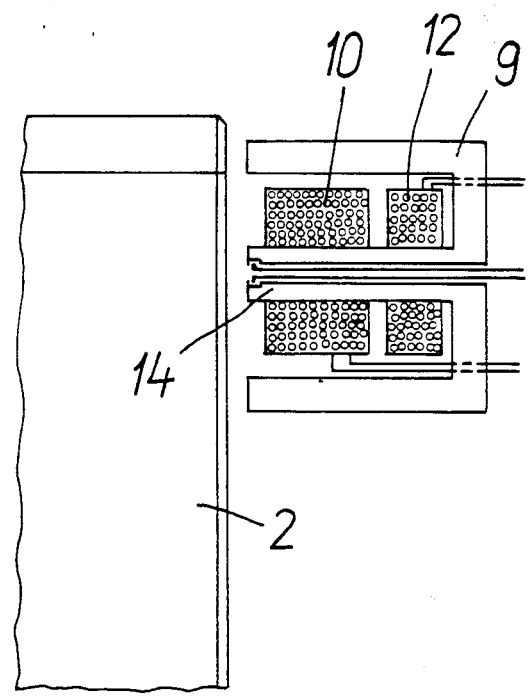

FIG. 4 shows that electromagnets can also be used instead of permanent magnets. As described in the preceding embodiments, an induction coil 10 is used to measure the induction voltages produced upon relative movement with respect to the basic holder 2. Induction coil 10 is wound around the core 14 of an iron yoke 9. However, the magnetic field is produced by a coil 12 wound around the same core. This embodiment has the advantage that no permanent magnet is required, that the coil producing the magnetic field can be switched on only during monitoring of the tool, and the magnetic field can be changed, thus enabling the sensor to attain optimum sensitivity.

Preferred induction coils have a diameter of 10 mm and a length of 5 mm with a number of windings between 1000 and 2000. Such coils can be easily fastened, for example, to the basic holder. In one embodiment, the magnet, coil and carrier, as well as a preamplifier, can be integrated on a plate bar disposed in a tubular aluminum sleeve and designed to serve as the head piece of an otherwise flexible input cable for the amplifier.

The Hall probe employed requires a supply voltage of 1 to 2 V and furnishes an output voltage of about 200 mV. The signals obtained from the Hall probe, the induction coil, and a prior art strain gauge employed in the past, amplified in each case, are shown in FIGS. 5 to 7.

Figure 5:
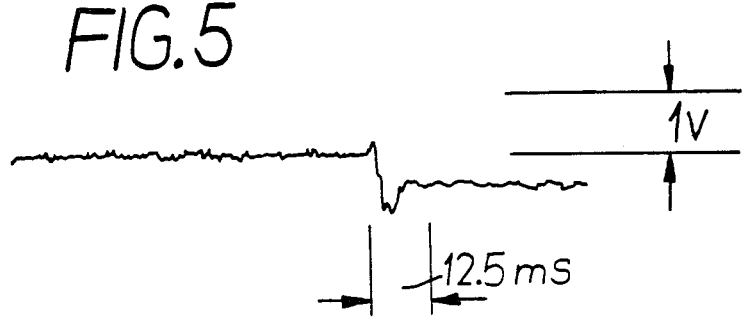
FIG. 5 is a waveform diagram of the signals furnished by a prior art strain gauge used to monitor for breakage.

As shown in FIG. 5, a sudden voltage change originating from a strain gauge whose output signals were amplified about 1000 times, indicates a break in the tool. This change is hardly distinguishable from the noise signals even after filtering. After amplification, the sudden change in voltage is about 0.6 V.

Figure 6:
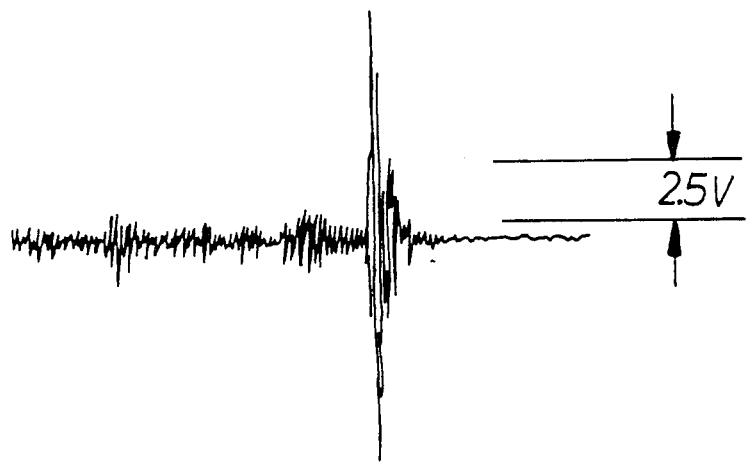
FIGS. 6 and 7 are waveform diagrams showing the signals produced by devices according to the present invention.

In contrast thereto, FIG. 6 shows, for the same tool breakage, a measurement signal originating from an induction coil (dynamic measurement). The positive and the negative voltage peak values are about 14 V and are thus not only greater by an order of magnitude but also clearly distinguishable from the noise level. Moreover, the peak values occur practically without delay compared to the sudden change in voltage according to FIG. 5 and thus permit faster shutdown of the machine to protect tool and workpiece.

Figure 7:
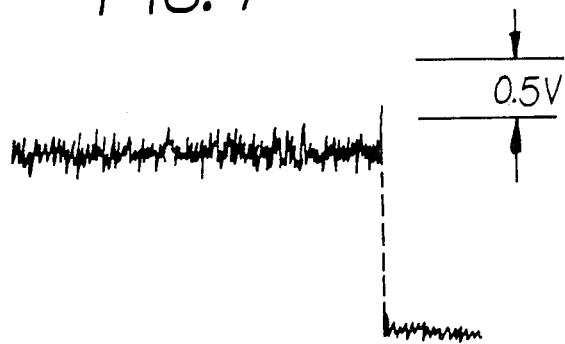

FIG. 7 shows the voltage curve in connection with the use of a Hall probe (static measurement). Here again the sudden change in voltage is extremely rapid and is detectable because it is clearly distinguishable from the background noise. The change in voltage is about 3 V.

FIGS. 5 to 7 all have the same time scale: 12.5 msec, corresponding to the length unit shown in FIG. 5.

The invention now being fully described, it will be apparent to one of ordinary skill in the art that many changes and modifications can be made thereto without departing from the spirit or scope of the invention as set forth herein.

What is claimed is:

1. Method for the fast contactless monitoring of a working tool for breakage and wear, the working tool being installed in a machine tool having first and second parts, with the first part being connected to the working tool and being moved relative to the second part by forces imposed on the working tool during machine tool operation, said method comprising:
    establishing a magnetic field which is stationary with respect to one of the parts and which penetrates the other part;
    indirecting measuring changes in distance between the parts due to forces imposed on the working tool during machine tool operation by means of a magnetic field probe disposed for sensing changes in the magnetic field resulting from such changes in distance; and
    emitting a signal when the measuring result exceeds predetermined limit values indicating wear or breakage of the working tool.

2. A method as defined in claim 1 wherein the working tool is automatically exchangeable in the machine tool.

3. A method as defined in claim 1 wherein the machine tool has a turret constituting the first part and a turret housing constituting the second part, and the probe is carried by the turret housing.

4. A method as defined in claim 1 wherein the probe includes an induction coil and said step of measuring comprises measuring rapid changes in distance between the parts by means of the induction coil.

5. A method as defined in claim 1 wherein the probe includes a Hall porbe and said step of measuring comprises measuring slow changes in distance between the parts by means of the Hall probe.

6. Method as defined in claim 1 wherein said step of monitoring comprises producing a magnetic field and disposing a measuring coil in the magnetic field such that relative movement between the two parts causes the coil to produce one induced voltage.

7. Method as defined in claim 1 wherein the magnetic field is spatially nonuniform and said step of monitoring further comprises disposing a Hall probe in the magnetic field such that a change in position between the two parts causes the Hall probe to produce a second induced voltage representative of such change.

8. Method as defined in claim 1 wherein said step of monitoring comprises producing a spatially nonuniform magnetic field and disposing a Hall probe in the magnetic field such that a change in relative position between the two parts causes the Hall probe to produce one induced voltage.

9. Method as defined in claim 1 wherein said step of monitoring comprises providing a magnet producing a magnetic field which is the source of induced voltage.

10. Method as defined in claim 9 wherein the machine has a tool carrier to which the magnet is fastened.

11. Method as defined in claim 9 wherein the machine has a basic tool holder to which the magnet is fastened.

12. Method as defined in claim 9 wherein the machine has a turret to which the magnet is fastened.

13. Method as defined in claim 9 wherein the magnet is a permanent magnet.

14. A machine tool having an apparatus for the fast contactless monitoring of a working tool for breakage and wear, said machine tool comprising:
    a first part of the machine tool;
    a second part of the machine tool, the working tool being connectable to the second part, the second part being moved relative to the first part by forces imposed on the working tool during machine tool operation;
    means establishing a magnetic field which is stationary with respect to one of the parts and which penetrates the other part;
    monitoring means including an induction coil and a Hall probe for indirectly measuring changes in distance between the parts due to forces imposed on the working tool during machine tool operation by sensing changes in the magnetic field resulting from such changes in distance, with fast changes in distance being detected as a voltage induced in said coil and slow changes in distance being detected as a Hall voltage generated in said Hall probe; and
    indicating means connected for emitting a signal when the measuring result exceeds predetermined limit values indicating wear or breakage of the working tool.

15. A machine tool as defined in claim 14 wherein said second part is a tool carrier.

16. A machine tool as defined in claim 14 wherein said second part is a basic tool holder.

17. A machine tool as defined in claim 14 wherein said second part is a turret.

18. A machine tool as defined in claim 14 wherein said monitoring means further comprise an iron core on which said coil is wound.

19. A machine tool as defined in claim 14 wherein said coil is wound around said Hall probe.

20. A machine tool as defined in claim 14 wherein said monitoring means further comprise an iron core in which said Hall probe is embedded.

21. A machine tool as defined in claim 14 wherein said second part comprises means for receiving one of a plurality of automatically exchangeable working tools.

22. A machine tool as defined in claim 14 wherein said machine tool has a turret constituting said second part and a turret housing constituting said first part, and said coil and said probe are carried by said turret housing.

* * * * *